(12) United States Patent
Mizusawa

(10) Patent No.: US 8,543,120 B2
(45) Date of Patent: Sep. 24, 2013

(54) COMMUNICATION CONTROL DEVICE, TERMINAL DEVICE, RADIO COMMUNICATION SYSTEM, RADIO COMMUNICATION METHOD, AND PROGRAM

(75) Inventor: Nishiki Mizusawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 226 days.

(21) Appl. No.: 13/053,554

(22) Filed: Mar. 22, 2011

(65) Prior Publication Data

US 2011/0244871 A1   Oct. 6, 2011

(30) Foreign Application Priority Data

Mar. 30, 2010   (JP) .................................. 2010-079072

(51) Int. Cl.
*H04W 40/00*   (2009.01)

(52) U.S. Cl.
USPC ........... 455/445; 455/436; 455/438; 455/439; 455/437; 455/443; 370/328; 370/329; 370/330; 370/331; 370/332

(58) Field of Classification Search
USPC ........................ 455/436–445; 370/328–333
See application file for complete search history.

(56) References Cited

U.S. PATENT DOCUMENTS

| 8,041,335 | B2 * | 10/2011 | Khetawat et al. | ........... 455/404.2 |
| 8,446,816 | B2 * | 5/2013 | Morishige et al. | ............. 370/216 |
| 2008/0020759 | A1 * | 1/2008 | Nagarajan et al. | ............ 455/433 |
| 2008/0070565 | A1 | 3/2008 | Maeda | |
| 2009/0232099 | A1 * | 9/2009 | Maenpaa | ....................... 370/332 |

FOREIGN PATENT DOCUMENTS

WO   WO 2006/054341 A1   5/2006
WO   WO 2010016704 A2 *   2/2010

OTHER PUBLICATIONS

Tutanyi et al, U.S. Appl. No. 61/171,926, U.S. Publication No. 20120076047, PCT filed: Apr. 21, 2012, PCT No. PCT/IB10/51758.*

* cited by examiner

*Primary Examiner* — Olumide T Ajibade Akonai
(74) *Attorney, Agent, or Firm* — Wolf, Greenfield & Sacks, P.C.

(57) ABSTRACT

There is provided a communication control device including a radio communication unit communicating with a terminal device, a network communication unit accessing any one of a plurality of gateway apparatuses through a network and relaying communication between the terminal device and the gateway apparatus, and a control unit switching the gateway apparatus to be accessed by the network communication unit.

6 Claims, 11 Drawing Sheets

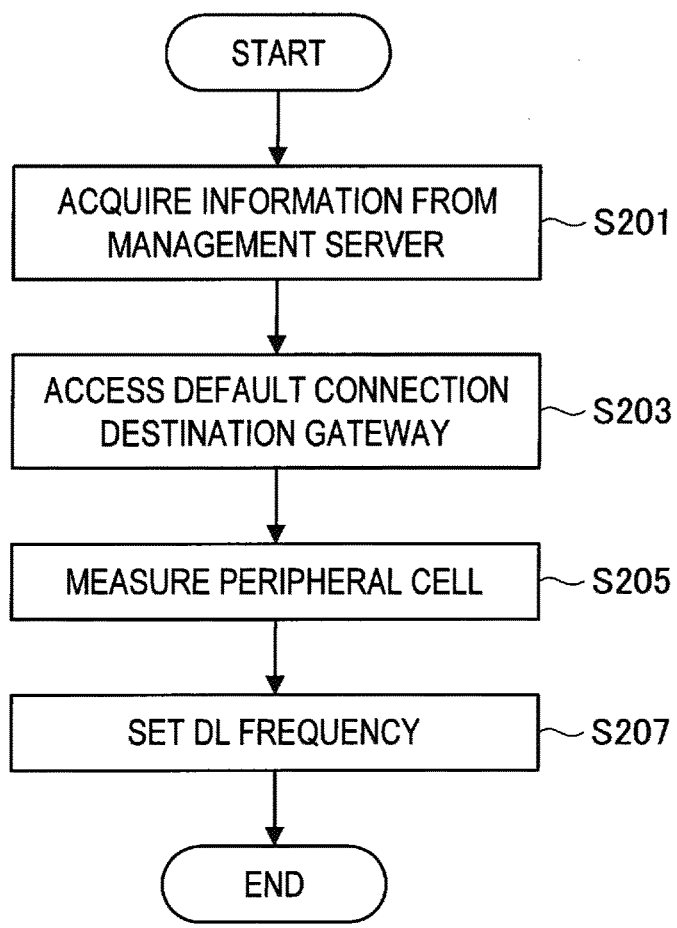

TERMINAL ID-1
    FEMTOCELL ID-1
    FEMTOCELL ID-2
TERMINAL ID-2
    FEMTOCELL ID-2
    FEMTOCELL ID-3
TERMINAL ID-3
    FEMTOCELL ID-1
    FEMTOCELL ID-4
    ·
    ·
    ·

FEMTOCELL ID-1 : 35°40'N    139°46'E
   ○FEMTOCELL GW-1 : 192, 0, xx, xx : FREQUENCY 1, 2, 3
    FEMTOCELL GW-2 : 192, 0, yy, yy : FREQUENCY 4, 5
    FEMTOCELL GW-3 : 192, 0, zz, zz : FREQUENCY 6

FEMTOCELL ID-2 : 35°41'N    139°42'E
   ○FEMTOCELL GW-1 : 192, 0, xx, xx : FREQUENCY 1, 2, 3
    FEMTOCELL GW-3 : 192, 0, zz, zz : FREQUENCY 6

FEMTOCELL ID-3 : 35°39'N    139°07'E
   ○FEMTOCELL GW-1 : 192, 0, xx, xx : FREQUENCY 1, 2, 3
    FEMTOCELL GW-2 : 192, 0, yy, yy : FREQUENCY 4, 5

FEMTOCELL ID-4 : 35°27'N    139°38'E
   ○FEMTOCELL GW-2 : 192, 0, yy, yy : FREQUENCY 4, 5
    FEMTOCELL GW-3 : 192, 0, zz, zz : FREQUENCY 6
   ·
   ·
   ·

FIG. 9

| FEMTOCELL ID-1 | | | | | | | | | | | | | |
|---|---|---|---|---|---|---|---|---|---|---|---|---|---|
| FREQUENCY | 1 | | 3 | | | | 5 | | | 6 | | | |
| SPREAD CODE | 2 | 3 | 4 | 2 | 3 | 5 | 2 | 5 | 6 | 2 | 3 | 5 | 6 |
| DATE | | | | | | | | | | | | | |
| 2009.11.1. 12:00:00 | -90 | -85 | -72 | -80 | -70 | -85 | -85 | -92 | -83 | -85 | -80 | -92 | -82 |
| 2009.11.1. 12:10:00 | | | -76 | | -72 | | | | -80 | | -76 | | -84 |
| 2009.11.1. 12:20:00 | | -80 | -80 | | -75 | | -82 | | -86 | -82 | | | |
| 2009.11.1. 12:30:10 | | | -72 | -78 | -80 | | -78 | | | | -82 | | -80 |

AVAILABLE TERMINAL LIST
    TERMINAL ID-1
    TERMINAL ID-3

FEMTOCELL GATEWAY LIST
    ○ FEMTOCELL GW-1 : 192, 0, xx, xx :  FREQUENCY 1, 2, 3
      FEMTOCELL GW-2 : 192, 0, yy, yy :  FREQUENCY 4, 5
      FEMTOCELL GW-3 : 192, 0, zz, zz :  FREQUENCY 6

IDLE TERMINAL LIST
    TERMINAL ID-1

ACTIVE TERMINAL LIST
    TERMINAL ID-3
```

COMMUNICATION CONTROL DEVICE, TERMINAL DEVICE, RADIO COMMUNICATION SYSTEM, RADIO COMMUNICATION METHOD, AND PROGRAM

BACKGROUND OF THE INVENTION

1. Field of the Invention

The present invention relates to a communication control device, a terminal device, a radio communication system, a radio communication method and a program.

2. Description of the Related Art

In recent years, in order for a terminal device such as a cell phone to perform high speed radio communication, an indoor small base station (hereinafter, referred to as a femtocell base station) has been put to practical use. The femtocell base station is a base station which communicates with terminal devices in the coverage narrower than that of the conventional base station, and relays the access to the Internet through a broadband line (hereinafter, referred to as a BB line) such as an asymmetric digital subscriber line (ADSL), a fiber to the home (FTTH) or a cable television (CATV). For example, such femtocell base station is disclosed in International Publication No. 2006/54341.

In the Internet access using the femtocell base station, since the distance between the femtocell base station and a cell phone is short, the signal-to-noise ratio in radio communication is increased. Furthermore, since the coverage is narrow, the number of other terminal devices sharing radio resources in the same femtocell base station is small. Consequently, it is possible to achieve high throughput as compared with the conventional Internet access in which a bottleneck frequently occurs in radio communication between a terminal device and a base station for a macrocell and the like.

Herein, the femtocell base station accesses a gateway apparatus of a core network through the BB line. Only a terminal device of a user having contracted with a communication provider operating the core network can access the core network via the femtocell base station and the gateway apparatus.

Furthermore, there are a plurality of core networks operated by other communication providers. Therefore, a terminal device of a user having contracted with another communication provider different from a communication provider operating a core network accessible by the femtocell base station through a gateway apparatus may be in the coverage of the femtocell base station.

In such a case, since the terminal device of the user having contracted with the other communication provider do not use the femtocell base station, the terminal device uses a base station such as macrocell base station other than the femtocell base station or separately uses a femtocell base station for the other communication provider.

SUMMARY OF THE INVENTION

However, a femtocell base station can access a gateway apparatus of a core network operated by another communication provider in terms of hardware. In spite of this, since the femtocell base station does not have a function of switching a gateway apparatus which is a connection destination, even when a terminal device communicating with the femtocell base station is not in the coverage, the terminal device of the user having contracted with the other communication provider alternatively do not access the gateway apparatus of the core network, so that hardware resources will not be sufficiently utilized.

In light of the foregoing, it is desirable to provide a novel and improved communication control device, a terminal device, a radio communication system, a radio communication method and a program, which can provide a high speed communication environment to a terminal device having contracted with a plurality of different communication providers.

According to an embodiment of the present invention, there is provided a communication control device including a radio communication unit communicating with a terminal device, a network communication unit accessing any one of a plurality of gateway apparatuses through a network and relaying communication between the terminal device and the gateway apparatus, and a control unit switching the gateway apparatus to be accessed by the network communication unit.

By such configuration, single communication control device can switch the gateway apparatus to access depending on the situation. Hardware resources of the communication control device may be sufficiently utilized by providing more terminal devices a chance to use them.

The control unit may further switch a frequency band used by the radio communication unit when communicating with the terminal device.

The control unit may switch the gateway apparatus to be accessed by the network communication unit based on a state of the terminal device communicating with the radio communication unit.

The control unit may start standing by for a predetermined time when the terminal device does not perform data communication, and switch the gateway apparatus to be accessed by the network communication unit when the terminal device does not perform the data communication even after the predetermined time is over.

The communication control device may further include a measurement unit measuring radio waves transmitted from another terminal device which does not communicate with the radio communication unit. The control unit may cause the measurement unit to start measurement when the terminal device does not perform data communication, and switch the gateway apparatus to be accessed by the network communication unit when the terminal device does not perform the data communication even after the measurement is ended and the radio waves transmitted from the other terminal device are detected by the measurement.

The control unit may switch the gateway apparatus to be accessed by the network communication unit based on an instruction from an outside of the communication control device.

According to another embodiment of the present invention, there is provided a terminal device including a radio communication unit communicating with a communication control device. The terminal device accesses any one of a plurality of gateway apparatuses through the communication control device and a network, and the gateway apparatus to be accessed is switched by the communication control device.

According to yet another embodiment of the present invention, there is provided a radio communication system including a terminal device; and a communication control device. The communication control device includes a radio communication unit communicating with the terminal device, a network communication unit accessing any one of a plurality of gateway apparatuses through a network and relaying communication between the terminal device and the gateway apparatus, and a control unit switching the gateway apparatus to be accessed by the network communication unit.

According to yet another embodiment of the present invention, there is provided a communication control method including the steps of communicating with a terminal device, accessing any one of a plurality of gateway apparatuses through a network and relaying communication between the terminal device and the gateway apparatus, and switching to an other gateway apparatus of the plurality of gateway apparatuses through a network to access the other gateway apparatus, and relaying communication between the terminal device and the other gateway apparatus.

According to yet another embodiment of the present invention, there is provided a program for causing a computer to function as a radio communication unit communicating with a terminal device, a network communication unit accessing any one of a plurality of gateway apparatuses through a network and relaying communication between the terminal device and the gateway apparatus, and a control unit switching to an other gateway apparatus of the plurality of gateway apparatuses through a network to access the other gateway apparatus and relaying communication between the terminal device and the other gateway apparatus.

According to the embodiments of the present invention described above, it is possible to provide a high speed communication environment to a terminal device having contracted with a plurality of different communication providers.

BRIEF DESCRIPTION OF THE DRAWINGS

FIG. 6 is a flowchart showing an initial process performed by a communication control device according to an embodiment of the present invention.

FIG. 7 is a diagram showing an example of information stored in a management server according to an embodiment of the present invention.

FIG. 8 is a diagram showing an example of another type of information stored in a management server according to an embodiment of the present invention.

FIG. 9 is a diagram showing an example of a measurement result transmitted from a communication control device to a management server according to an embodiment of the present invention.

FIG. 10 is a diagram showing an example of information stored in a communication control device according to an embodiment of the present invention.

DETAILED DESCRIPTION OF THE EMBODIMENT

Hereinafter, a preferred embodiment of the present invention will be described in detail with reference to the appended drawings. Note that, in this specification and the drawings, elements that have substantially the same function and structure are denoted with the same reference signs, and repeated explanation is omitted.

Furthermore, in this specification and drawings, a plurality of elements having substantially the same function and structure may be distinguished from each other by adding different letters to the same reference sign. For example, a plurality of elements having substantially the same function and structure may be distinguished from each other such as cell phones 100A and 100B when necessary. However, when it is not necessary to specifically distinguish a plurality of elements having substantially the same function and structure from each other, the elements are denoted with only the same reference signs. For example, when it is not necessary to specifically distinguish the cell phones 100A and 100B from each other, they are simply called a cell phone 100.

Further, the description will be described in the following order.

1. Radio Communication System According to Embodiment of the Present Invention
   1-1. Configuration of Radio Communication System
   1-2. Location Registration Process in System
   1-3. Gateway Switching Process in System
2. Terminal Device According to Embodiment of the Present Invention
3. Communication Control Device According to Embodiment of the Present Invention
   3-1. Configuration of Communication Control Device
   3-2. Initial Process in Communication Control Device
   3-3. Management of Terminal Device in Communication Control Device
   3-4. Gateway Switching Process in Communication Control Device
      3-4-1. First Type
      3-4-2. Second Type
      3-4-3. Third Type
4. Supplement <1. Radio Communication System According to Embodiment of the Present Invention>

(1-1. Configuration of Radio Communication System)

Figure 1:
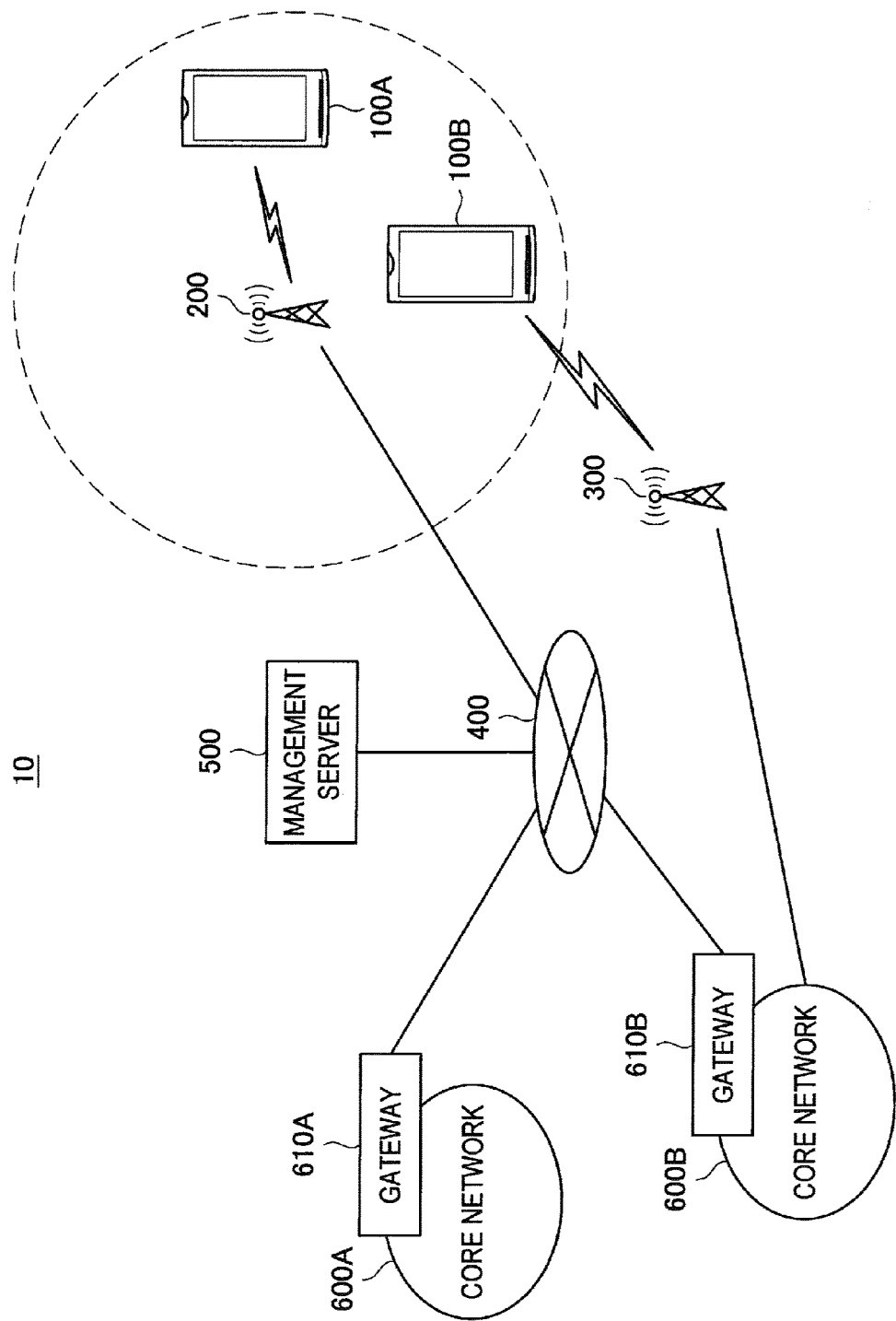
FIG. 1 is a diagram showing a configuration of a radio communication system according to an embodiment of the present invention.

FIG. 1 is a diagram showing a radio communication system 10 according to an embodiment of the present invention. The radio communication system 10 includes cell phones 100A and 100B, a femtocell base station 200, a macrocell base station 300, a network 400, a management server 500, core networks 600A and 600B, and gateway apparatus 610A and 610B.

The cell phones 100A and 100B are terminal devices according to the embodiment of the present invention. The cell phones 100A and 100B are in the coverage of the femtocell base station 200. A user of the cell phone 100A has contracted with a communication provider operating the core network 600A. Furthermore, a user of the cell phone 100B has contracted with a communication provider operating the core network 600B.

The femtocell base station 200 is a communication control device according to the embodiment of the present invention. The femtocell base station 200 communicates with the cell phone 100A, and accesses the gateway apparatus 610A of the core network 600A through the network 400 to relay communication between the cell phone 100A and the gateway apparatus 610A.

Furthermore, the femtocell base station 200 can switch a connection destination from the gateway apparatus 610A to the gateway apparatus 610B of the core network 600B under the predetermined conditions, and further switch an object to perform radio communication from the cell phone 100A to the cell phone 100B.

The macrocell base station 300 is a conventional base station and its coverage includes the coverage of the femtocell base station 200. The macrocell base station 300 communicates with the cell phone 100B and relays communication between the cell phone 100B and the core network 600B.

The network 400, for example, is a network on the Internet including a network of an internet service provider (ISP) which provides a high speed communication path through a BB line. The management server 500 is provided on the network 400 to manage the femtocell base station 200 when necessary.

For example, the management server 500 provides the femtocell base station 200 with information on a terminal device capable of performing communication through the femtocell base station 200 through a contract, information on the address of the gateway apparatus 610 accessible by the femtocell base station, and the like.

The core networks 600A and 600B are networks of a cell phone provider which provides a telephone service or a data communication service. The number of networks shown in FIG. 1 is two, that is, the core networks 600A and 600B, but many core networks may exist.

The gateway apparatus 610A and 610B allow the femtocell base station 200 to access the core networks 600A and 600B, respectively. The number of gateway apparatus provided in each core network shown in FIG. 1 is one, but one core network may include a plurality of different gateway apparatus according to an area occupied by the femtocell base station, and the like.

Figure 2:
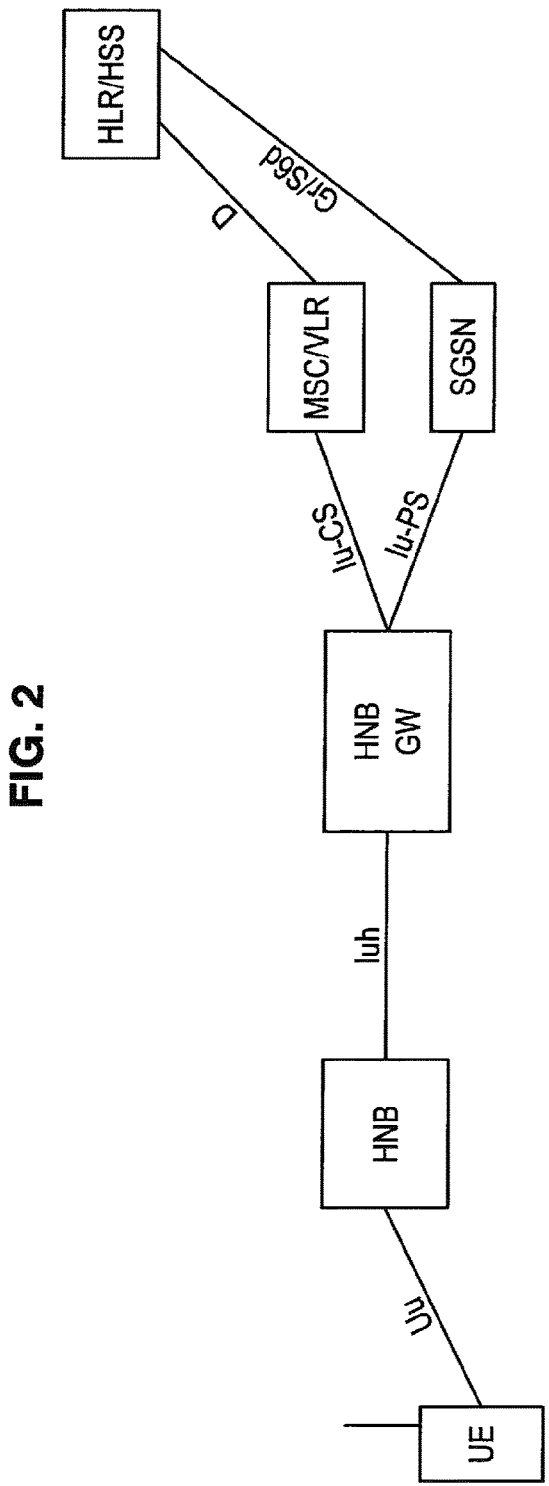
FIG. 2 is a diagram showing architecture applied to the radio communication system show in FIG. 1.

FIG. 2 is a diagram showing the architecture of a communication system, which is applied to the radio communication system 10 shown in FIG. 1 and standardized by the $3^{rd}$ Generation Partnership Project (3GPP). Among network nodes shown in FIG. 2, a user equipment (UE) corresponds to the cell phone 100, a home node B (HNB) corresponds to the femtocell base station 200, and an HNB gateway (HNB GW) corresponds to the gateway apparatus 610, respectively.

Furthermore, a mobile switching center/visitor location register (MSC/VLR), a serving GPRS support node (SGSN) and a home location register/home subscriber server (HLR/HSS) are nodes in the core network 600.

(1-2. Location Registration Process in System)

Figure 3:
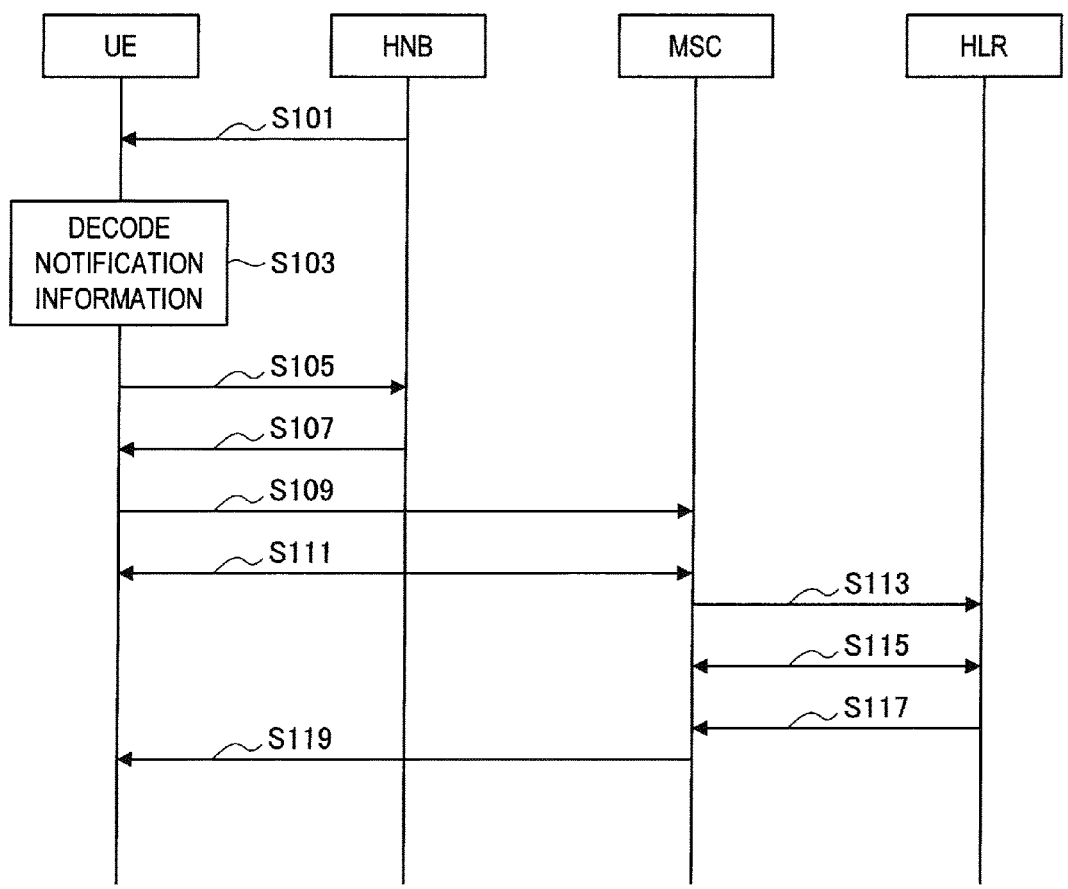
FIG. 3 is sequence diagram showing a location registration procedure performed in the architecture shown in FIG. 2.

FIG. 3 is a sequence diagram showing communication until the location of the UE (the cell phone 100) is registered in the architecture shown in FIG. 2.

First, the UE receives announcement information transmitted from the HNB (the femtocell base station 200) (step S101). Next, the UE decodes the announcement information (step S103). Herein, the UE transmits a radio resource access request to the HNB (step S105). In addition, the HNB transmits a radio resource setting request to the UE (step S107), so that a radio channel is set between the UE and the HNB.

Then, the UE transmits a location registration request to the MSC (a node in the core network 600) through the HNB (step S109). Herein, the MSC authenticates the UE (step S111). After the UE is authenticated, the MSC transmits a location registration request to the HLR (a node in the core network 600) (step S113).

Herein, the HLR exchanges subscriber information with the MSC (step S115) and updates location registration information of the UE. Next, the HLR transmits a location registration response to the MSC (step S117) and the MSC transmits the location registration response to the UE through the HNB (step S119), thereby completing the location registration of the UE.

Through the above procedure, the location of the UE is registered in the HLR of the core network, so that the UE is in a state in which data communication is possible. Herein, since the location registration response from the MSC is transmitted through the HNB, the HNB (the femtocell base station 200) can recognize the location registration state of the UE (the cell phone 100).

(1-3. Gateway Switching Process in System)

A gateway switching process in the radio communication system 10 according to the embodiment of the present invention will be described with reference again to FIG. 1. First, according to the procedure as shown in FIG. 3, the location of the cell phone 100A is registered in the HLR of the core network 600A via the femtocell base station 200.

Herein, a case in which the cell phone 100A has moved out of the coverage of the femtocell base station 200, the cell phone 100A does not perform data communication in an idle state, or a user has explicitly instructed switching through the cell phone 100A and the like is considered.

In such a case, the femtocell base station 200 itself detects that the cell phone 100A does not perform data communication, or receives a switching instruction from a user. Then, the femtocell base station 200 switches a connection destination from the gateway apparatus 610A to the gateway apparatus 610B.

Next, the femtocell base station 200 relays the location registration of the cell phone 100B in the HLR of the core network 600B. In this way, the gateway switching process in the radio communication system 10 is completed.

<2. Terminal Device According to Embodiment of the Present Invention>

Figure 4:
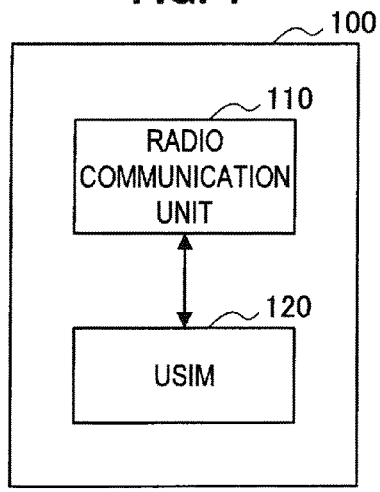
FIG. 4 is a diagram showing a configuration of a terminal device according to an embodiment of the present invention.

FIG. 4 is a diagram showing the functional structure of the cell phone 100 which is the terminal device according to the embodiment of the present invention. The cell phone 100 includes a radio communication unit 110 and a universal subscriber identity module (USIM) 120.

The radio communication unit 110 is a radio communication interface which communicates with the femtocell base station 200 and the like and includes an antenna, a transmission/reception circuit and the like. The USIM 120 holds information, such as terminal IDs, which is necessary when the cell phone 100 registers its own location in the HLR of the core network 600.

Herein, when a communication provider operating the core network 600A including the gateway apparatus 610A accessed by the femtocell base station 200 is different from a communication provider with whom a user of the cell phone 100 has contracted (which corresponds to the cell phone 100B shown in FIG. 1), the cell phone 100 will not register its own location in the HLR of the core network 600A using the information held in the USIM 120. In such a case, the radio communication unit 110 of the cell phone 100 communicates with the macrocell base station 300 and the like at a relatively low speed.

However, in the embodiment of the present invention, the femtocell base station 200 may switch a connection destination from the gateway apparatus 610A to the gateway apparatus 610B. In such a case, if a communication provider operating the core network 600B including the gateway apparatus 610B is the same as the communication provider with whom the user of the cell phone 100 has contracted, the cell phone 100 can newly register its own location in the HLR of the core network 600B using the information held in the USIM 120. In such a case, the radio communication unit 110 of the cell phone 100 communicates with the femtocell base station 200 at a high speed.

<3. Communication Control Device According to Embodiment of the Present Invention>

(3-1. Configuration of Communication Control Device)

Figure 5:
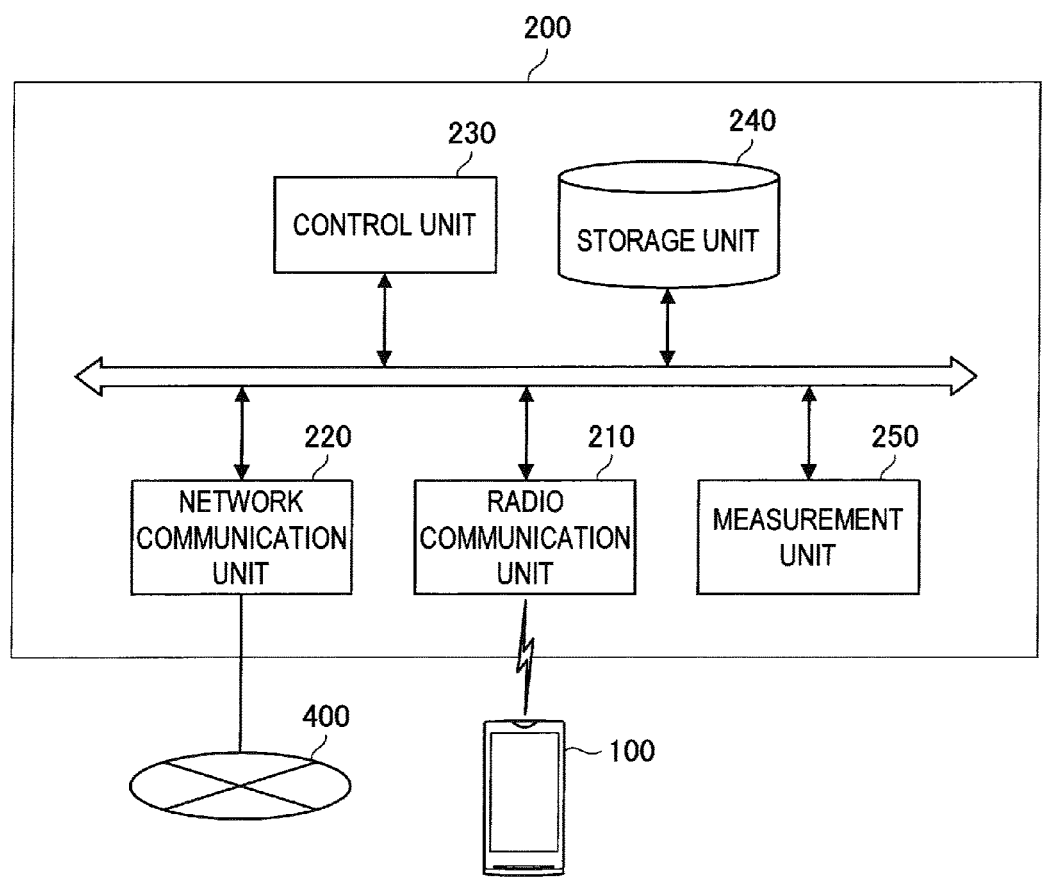
FIG. 5 is a diagram showing a configuration of a communication control device according to an embodiment of the present invention.

FIG. 5 is a diagram showing the functional structure of the femtocell base station 200 which is the communication control device according to the embodiment of the present invention. The femtocell base station 200 includes a radio communication unit 210, a network communication unit 220, a control unit 230 and a storage unit 240, and further includes a measurement unit 250 when necessary.

The radio communication unit 210 is a communication interface which communicates with the cell phone 100 and includes an antenna, a transmission/reception circuit and the like. A frequency used by the radio communication unit 210 when communicating with the cell phone 100 is a frequency used for radio communication of the communication provider with whom the user of the cell phone 100 has contracted, that is, the communication provider operating the core network 600 accessed by the femtocell base station 200 through the gateway apparatus 610.

The network communication unit 220 is a communication interface which communicates with the network 400 and accesses a local area network (LAN) and the like. The network communication unit 220 accesses the gateway apparatus 610 through the network 400 to relay communication between the cell phone 100 and the gateway apparatus 610.

The control unit 230 controls the radio communication unit 210 and the network communication unit 220. In detail, the control unit 230 decides the frequency used by the radio communication unit 210 when communicating with the cell phone 100, and the gateway apparatus 610 accessed by the network communication unit 220 through the network 400.

The function of the control unit 230 may be performed by a dedicated hardware or performed by a program executed by a central processing unit (CPU). The program may be stored in the storage unit 240 or downloaded from the network 400 through the network communication unit 220.

The storage unit 240 stores information necessary for the function of the control unit 230. The function of the storage unit 240 is performed by appropriately combining storage devices such as read only memories (ROMs) or random access memories (RAMs), secondary storage devices such as hard disk drives (HDDs), or removable storage medium such as optical discs or semiconductor memories.

The measurement unit 250 measures downlink radio waves of cells around the femtocell base station 200, or uplink radio waves of other terminal devices which are positioned around the femtocell base station 200 but do not communicate with the radio communication unit 210. The measurement unit 250 may be implemented by a hardware such as a measurement circuit, or by a program executed by a CPU similarly to the control unit 230.

(3-2. Initial Process in Communication Control Device)

FIG. 6 is a flowchart showing an initial process performed by the femtocell base station 200 which is the communication control device according to the embodiment of the present invention.

First, the control unit 230 of the femtocell base station 200 communicates with the management server 500 on the network 400 through the network communication unit 220, and acquires a list of available terminal devices from a list 501 of terminal devices—femtocell IDs as shown in FIG. 7 and a list of connection destination gateways from a list 503 of femtocell IDs—gateways as shown in FIG. 8, respectively (step S201). The acquired information is temporarily stored in the storage unit 240.

FIG. 7 is a diagram showing an example of the list 501 of terminal devices—femtocell IDs, which is stored in the management server 500. In the list 501 of terminal devices—femtocell IDs, terminal IDs allocated to terminal devices such as the cell phone 100 correspond to IDs of femtocells in which the locations of the terminal devices can be registered, respectively.

For example, as can be seen from the list 501 of terminal devices—femtocell IDs as shown in FIG. 7, a terminal device having the terminal ID-1 allocated thereto can register its own location through a femtocell base station having the femtocell ID-1 allocated thereto or a femtocell base station having the femtocell ID-2 allocated thereto.

In step S201 of FIG. 6, the management server 500 extracts a terminal ID corresponding to a femtocell ID allocated to the femtocell base station 200 from the list 501 of terminal devices—femtocell IDs. The control unit 230 of the femtocell base station 200 acquires the extraction result through the network communication unit 220 as the list of available terminal devices.

FIG. 8 is a diagram showing an example of the list 503 of femtocell IDs—gateways, which is stored in the management server 500. In the list 503 of femtocell IDs—gateways, femtocell IDs allocated to femtocell base stations correspond to location information of the femtocell base stations, network addresses of accessible gateway apparatus (gateways marked by 'O' are default connection destinations), and frequency information, respectively.

For example, as can be seen from the list 503 of femtocell IDs—gateways as shown in FIG. 8, the femtocell base station having the femtocell ID-1 allocated thereto is installed at a place of 35° 40' N, 139° 46' E and can access any one gateway apparatus of a femtocell GW-1, a femtocell GW-2 and a femtocell GW-3.

In addition, as can be seen from the list 503 of femtocell IDs—gateways, a gateway apparatus accessed by default by the femtocell base station having the femtocell ID-1 allocated thereto is the femtocell GW-1, the network address of the femtocell GW-1 is "192, 0, xx, xx," and a frequency available when the femtocell base station having accessed the femtocell GW-1 communicates with a terminal device is any one of frequencies 1, 2 and 3.

In step S201 of FIG. 6, the management server 500 extracts information corresponding to a femtocell ID allocated to the femtocell base station 200 from the list 503 of femtocell IDs—gateways. The control unit 230 of the femtocell base station 200 acquires the extraction result through the network communication unit 220 as the list of connection destination gateways.

Next, the control unit 230 of the femtocell base station 200 determines the gateway apparatus 610 (marked by 'O' in FIG. 8) which is a default connection destination from the list of connection destination gateways, which is acquired from the management server 500 in step S201, and causes the network communication unit 220 to access the gateway apparatus 610 (step S203).

Then, the measurement unit 250 acquires information on a frequency band available for the gateway apparatus 610 which is a default connection destination from the list of connection destination gateways, and measures a downlink of a peripheral cell over the whole of the frequency band (step S205).

In addition, the measurement unit 250, for example, searches for a spread code of the measured downlink to specify a frequency used and radio field intensity of the peripheral cell, and reports a measurement result to the management server 500 through the network communication unit 220 in the form of a measurement result 505 as shown in FIG. 9. The management server 500 having received the report selects a frequency and a spread code in which interference with the peripheral cell is small based on the measurement result, and notifies the femtocell base station 200 of the selected frequency and spread code.

The control unit 230 of the femtocell base station 200 having received the notification sets a downlink frequency and a spread code based on the notification, and starts to transmit announcement information and the like through the radio communication unit 210 (step S207).

FIG. 9 is an example of the measurement result 505 reported to the management server 500 from the measurement unit 250 in step S207. The measurement result 505 shows a result obtained by measuring the peripheral cell of the femtocell base station 200 having the femtocell ID-1 allocated thereto.

The management server 500, for example, can read the facts that the measurement unit 250 of the femtocell base station 200 has performed the measurement using frequencies 1, 3, 5 and 6, and communication is performed with spread codes 2, 3 and 4 in the frequency 1 by the peripheral cell, and a change in radio field intensity according to the passage of time in each spread code of each frequency from the measurement result 505 shown in FIG. 9.

(3-3. Management of Terminal Device in Communication Control Device)

After the initial process shown in FIG. 6 is performed, a terminal device such as the cell phone 100 within the coverage of the femtocell base station 200 can register its own location in a node in the core network 600 through the femtocell base station 200 according to the procedure as shown in FIG. 3.

Herein, a terminal device having registered its own location in the femtocell base station 200 but not performing data communication will be referred to as a terminal device in an idle state. Furthermore, a terminal device having registered its own location in the femtocell base station 200 and performing data communication will be referred to as a terminal device in an active state.

The control unit 230 of the femtocell base station 200 monitors the location registration and data communication using the radio communication unit 210 and the network communication unit 220. With such monitoring, the control unit 230 identifies a terminal device in an idle state and a terminal device in an active state among terminal devices having registered their own locations through the femtocell base station 200. Information on the identified terminal devices in the idle state and the active state is stored and updated in the storage unit 240.

FIG. 10 is a diagram showing an example of status information 201 stored in the storage unit 240 of the femtocell base station 200. The status information 201 includes a list of idle and active terminal devices, in addition to the list of available terminal devices and the list of connection destination gateways acquired in step S201 of FIG. 6.

The status information 201 is updated based on location registration and data communication. That is, when the location registration has been performed, a terminal ID is added to the list of idle terminal devices. When the data communication has been performed, the terminal ID is moved to the list of active terminal devices. Then, when the data communication is ended, the terminal ID is moved again to the list of idle terminal devices. In addition, when the location registration is released, the terminal ID is deleted from the list of idle terminal devices.

(3-4. Gateway Switching Process in Communication Control Device)

(3-4-1. First Type)

Figure 11:
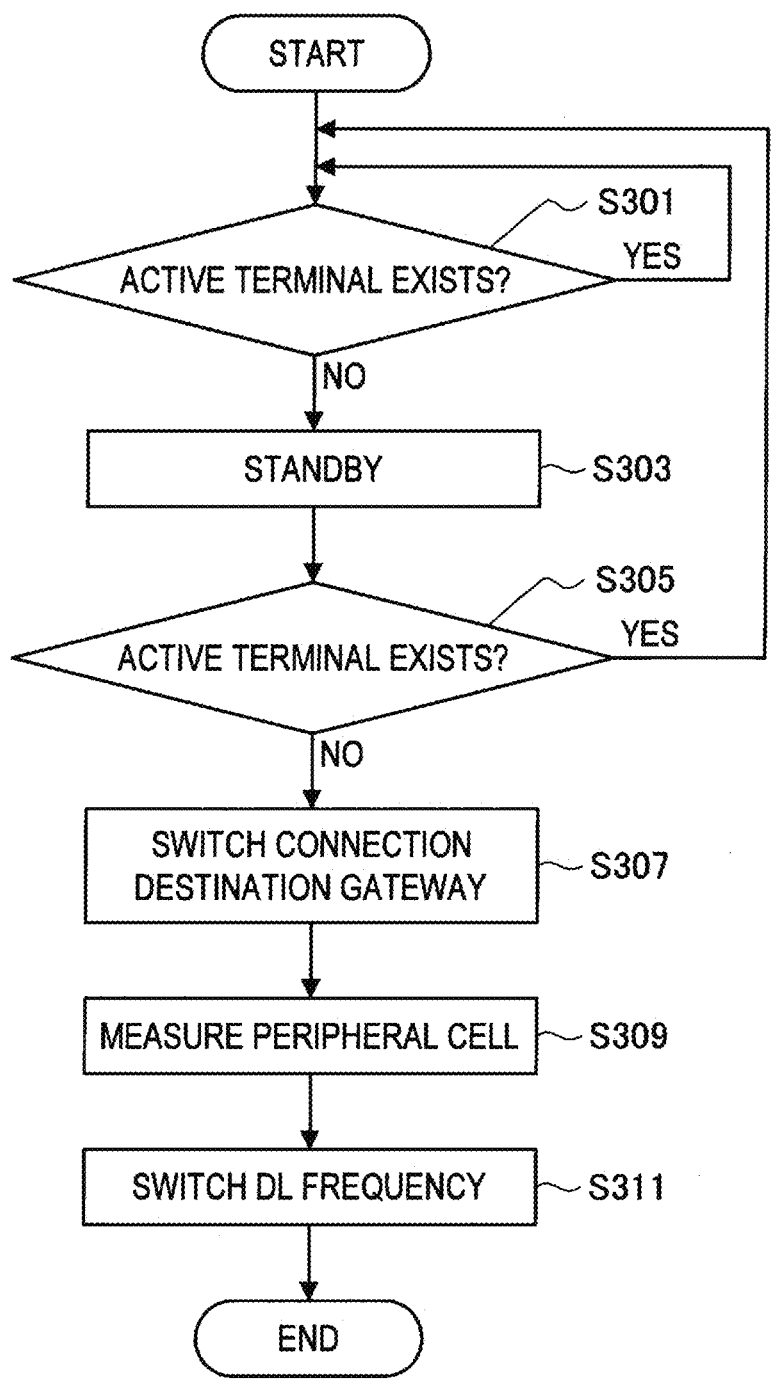
FIG. 11 is a flowchart showing a first type of a gateway switching process in a communication control device according to an embodiment of the present invention.

FIG. 11 is a flowchart showing the first type of the gateway switching process in the femtocell base station 200 which is the communication control device according to the embodiment of the present invention.

The following description of each type will begin from the state of the radio communication system 10 shown in FIG. 1, that is, the femtocell base station 200 accesses the gateway apparatus 610A and the cell phone 100A has registered its own location in the HLR of the core network 600A through the femtocell base station 200.

While relaying communication of a terminal device such as the cell phone 100A having completed location registration, the control unit 230 of the femtocell base station 200 monitors the status information 201 stored in the storage unit 240 and shown in FIG. 10, and determines whether there is an active terminal device (S301).

Herein, when there is no active terminal device, the control unit 230 enters a standby mode for a predetermined time by a timer and the like (step S303). When there is no active terminal device until the standby mode is ended (step S305), the control unit 230 switches a connection destination of the network communication unit 220.

In the switching, the control unit 230 acquires the network address of accessible another gateway apparatus 610B from the status information 201 stored in the storage unit 240 and shown in FIG. 10, and switches the connection destination of the network communication unit 220 from the gateway apparatus 610A to the gateway apparatus 610B (step S307).

Next, the measurement unit 250 acquires information on a frequency band available for the gateway apparatus 610B which is a new connection destination from the status information 201 stored in the storage unit 240 and shown in FIG. 10, and measures a downlink of a peripheral cell over the whole of the frequency band (step S309).

In addition, the measurement unit 250, for example, searches for a spread code of the measured downlink to specify a frequency used and radio field intensity of the peripheral cell, and reports a measurement result to the management server 500 through the network communication unit 220. The management server 500 having received the report selects a frequency and a spread code in which interference with the peripheral cell is small based on the measurement result, and notifies the femtocell base station 200 of the selected frequency and spread code.

The control unit 230 of the femtocell base station 200 having received the notification switches a downlink frequency and a spread code of the radio communication unit 210 based on the notification, and starts to transmit announcement information and the like through the radio communication unit 210 (step S311).

Thereafter, the cell phone 100B having received the announcement information can access the gateway apparatus 610B through the femtocell base station 200 and register its own location in the HLR of the core network 600B.

(3-4-2. Second Type)

Figure 12:
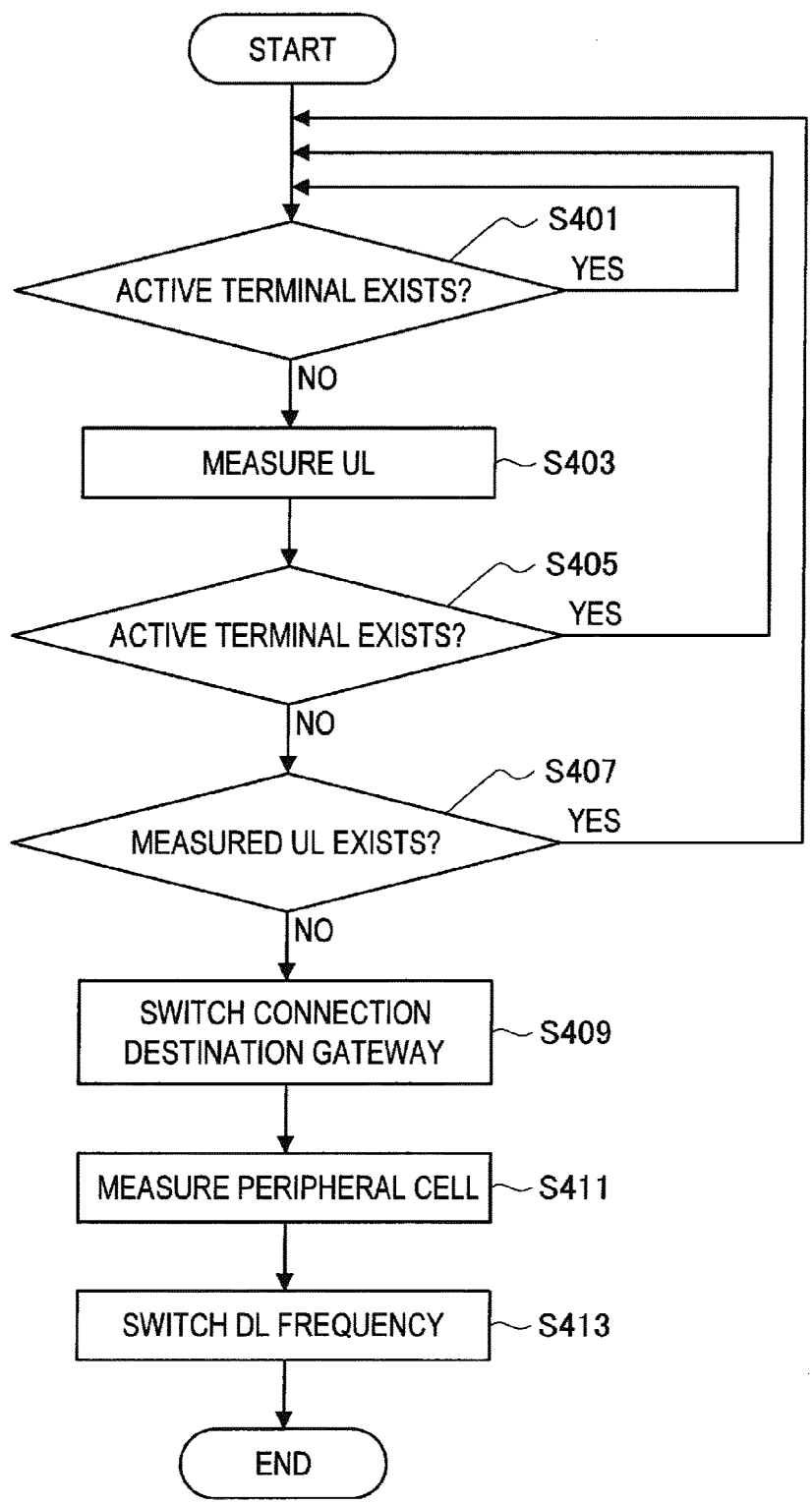
FIG. 12 is a flowchart showing a second type of a gateway switching process in a communication control device according to an embodiment of the present invention.

FIG. 12 is a flowchart showing the second type of the gateway switching process in the femtocell base station 200 which is the communication control device according to the embodiment of the present invention.

While relaying communication of a terminal device such as the cell phone 100A having completed location registration, the control unit 230 of the femtocell base station 200 monitors the status information 201 stored in the storage unit 240 and shown in FIG. 10, and determines whether there is an active terminal device (S401).

Herein, when there is no active terminal device, the measurement unit 250 measures an uplink over the whole of an uplink frequency band allocated to a communication scheme used by the radio communication unit 210 (step S403).

Herein, the uplink to be measured is an uplink by another terminal device such as the cell phone 100B not communicating with the femtocell base station 200, that is, a terminal device communicating with another base station such as the macrocell base station 300 although the terminal device is in the coverage of the femtocell base station 200.

When there is no active terminal device until the measurement is ended (step S405), if there is no uplink measured in step S403 (step S407), the control unit 230 switches a connection destination of the network communication unit 220.

In the switching, the control unit 230 acquires a gateway apparatus capable of using the frequency of the uplink measured in step S403, for example, the network address of the gateway apparatus 610B from the status information 201 stored in the storage unit 240 and shown in FIG. 10, and switches the connection destination of the network communication unit 220 from the gateway apparatus 610A to the gateway apparatus 610B (step S409).

Next, the measurement unit 250 acquires information on a frequency band available for the gateway apparatus 610B which is a new connection destination from the status information 201 stored in the storage unit 240 and shown in FIG. 10, and measures a downlink of a peripheral cell over the whole of the frequency band (step S411).

In addition, the measurement unit 250, for example, searches for a spread code of the measured downlink to specify a frequency used and radio field intensity of the peripheral cell, and reports a measurement result to the management server 500 through the network communication unit 220. The management server 500 having received the report selects a frequency and a spread code in which interference with the peripheral cell is small based on the measurement result, and notifies the femtocell base station 200 of the selected frequency and spread code.

The control unit 230 of the femtocell base station 200 having received the notification switches a downlink frequency and a spread code of the radio communication unit 210 based on the notification, and starts to transmit announcement information and the like through the radio communication unit 210 (step S413).

Thereafter, the cell phone 100B having received the announcement information can access the gateway apparatus 610B through the femtocell base station 200 and register its own location in the HLR of the core network 600B.

(3-4-3. Third Type)

Figure 13:
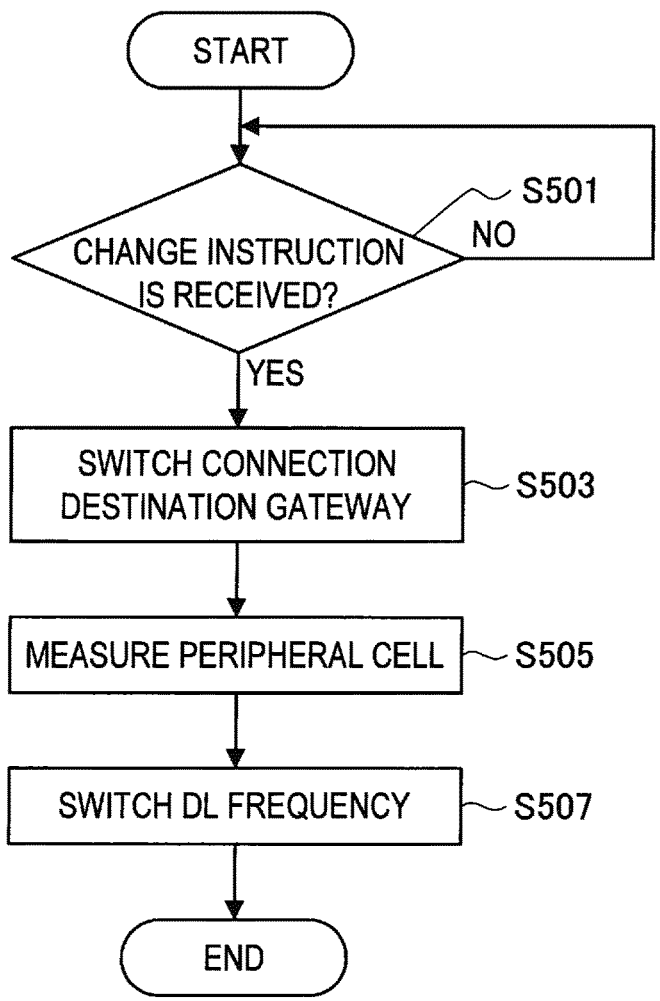
FIG. 13 is a flowchart showing a third type of a gateway switching process in a communication control device according to an embodiment of the present invention.

FIG. 13 is a flowchart showing the third type of the gateway switching process in the femtocell base station 200 which is the communication control device according to the embodiment of the present invention.

While relaying communication of a terminal device such as the cell phone 100A having completed the location registration, when a switching instruction is received from the outside of the femtocell base station 200 through the network communication unit 220 and the like (S501), the control unit 230 of the femtocell base station 200 switches a connection destination of the network communication unit 220.

Herein, the switching instruction, for example, may be provided by the management server 500 for managing location registration information of the femtocell base station 200, and the like, or by a user oneself of the cell phone 100A.

In the switching, the control unit 230 acquires the network address of the instructed another gateway apparatus 610B from the status information 201 stored in the storage unit 240 and shown in FIG. 10, and switches the connection destination of the network communication unit 220 from the gateway apparatus 610A to the gateway apparatus 610B (step S503).

Next, the measurement unit 250 acquires information on a frequency band available for the gateway apparatus 610B which is a new connection destination from the status information 201 stored in the storage unit 240 and shown in FIG. 10, and measures a downlink of a peripheral cell over the whole of the frequency band (step S505).

In addition, the measurement unit 250, for example, searches for a spread code of the measured downlink to specify a frequency used and radio field intensity of the peripheral cell, and reports a measurement result to the management server 500 through the network communication unit 220. The management server 500 having received the report selects a frequency and a spread code in which interference with the peripheral cell is small based on the measurement result, and notifies the femtocell base station 200 of the selected frequency and spread code.

The control unit 230 of the femtocell base station 200 having received the notification switches a downlink frequency and a spread code based on the notification, and starts to transmit announcement information and the like through the radio communication unit 210 (step S507).

Thereafter, the cell phone 100B having received the announcement information can access the gateway apparatus 610B through the femtocell base station 200 and register its own location in the HLR of the core network 600B.

<4. Supplement>

So far, although the preferred embodiments of the present invention have been described above with reference to the accompanying drawings, the present invention is not limited to the above examples. A person skilled in the art may find various alternations and modifications within the scope of the appended claims, and it should be understood that they will naturally come under the technical scope of the present invention.

For example, in the previous embodiment, the femtocell base station acquires the list of available terminal devices and the list of connection destination gateways from the management server. However, the present invention is not limited thereto. For example, the femtocell base station itself or the cell phones may hold information corresponding to the list of available terminal devices and the list of connection destination gateways.

In addition, in the embodiment, each of the cell phones can access only one gateway apparatus. However, the present invention is not limited thereto. For example, a user has signed a contract to allow the cell phone to access a plurality of gateway apparatus, and the femtocell base station may be configured to select and access a gateway apparatus in a favorable state while maintaining radio communication with the cell phone. Such a configuration, for example, is effective for the case where a change occurs in an access fee to a core network according to time slots.

Moreover, in the embodiment, the femtocell base station changes both a gateway apparatus to be accessed and a frequency used for radio communication. However, the present invention is not limited thereto. For example, the femtocell base station may switch only the frequency used for radio communication without switching the gateway apparatus to be accessed.

The present application contains subject matter related to that disclosed in Japanese Priority Patent Application JP 2010-079072 filed in the Japan Patent Office on Mar. 30, 2010, the entire content of which is hereby incorporated by reference.

What is claimed is:

1. A communication control device comprising:
   a radio communication unit communicating with a terminal device;
   a network communication unit accessing any one of a plurality of gateway apparatuses through a network and relaying communication between the terminal device and the gateway apparatus; and
   a control unit switching the gateway apparatus to be accessed by the network communication unit;
   wherein the control unit switches the gateway apparatus to be accessed by the network communication unit based on a state of the terminal device communicating with the radio communication unit; and
   wherein the control unit starts standing by for a predetermined time when the terminal device does not perform data communication, and switches the gateway apparatus to be accessed by the network communication unit when the terminal device does not perform the data communication even after the predetermined time is over.

2. The communication control device according to claim 1, wherein the control unit further switches a frequency band used by the radio communication unit when communicating with the terminal device.

3. The communication control device according to claim 1, wherein the control unit switches the gateway apparatus to be accessed by the network communication unit based on an instruction from an outside of the communication control device.

4. A communication control device comprising:
   a radio communication unit communicating with a terminal device;
      a network communication unit accessing any one of a plurality of gateway apparatuses through a network and relaying communication between the terminal device and the gateway apparatus;
   a control unit switching the gateway apparatus to be accessed by the network communication unit;
   a measurement unit measuring radio waves transmitted from another terminal device which does not communicate with the radio communication unit;
   wherein the control unit switches the gateway apparatus to be accessed by the network communication unit based on a state of the terminal device communicating with the radio communication unit; and
   wherein the control unit causes the measurement unit to start measurement when the terminal device does not perform data communication, and switches the gateway apparatus to be accessed by the network communication unit when the terminal device does not perform the data communication even after the measurement is ended and the radio waves transmitted from the other terminal device are detected by the measurement.

5. A communication control method comprising, the steps of:
   communicating with a terminal device;
   accessing any one of a plurality of gateway apparatuses through a network and relaying communication between the terminal device and the gateway apparatus; and
   after a predetermined time when the terminal device does not perform data communication, switching to another gateway apparatus of the plurality of gateway apparatuses through a network to access the other gateway apparatus, and relaying communication between the terminal device and the other gateway apparatus.

6. A computer readable medium on which is stored a program which when implemented by a computer, causes the computer to function as:
   a radio communication unit communicating with a terminal device,
   a network communication unit accessing any one of a plurality of gateway apparatuses through a network and relaying communication between the terminal device and the gateway apparatus, and
   a control unit switching to another gateway apparatus of the plurality of gateway apparatuses through a network to access the other gateway apparatus and relaying communication between the terminal device and the other gateway apparatus, after a predetermined time when the terminal device does not perform data communication.

* * * * *